Feb. 17, 1931. P. J. MARKS 1,792,997
CAMERA
Original Filed Sept. 13, 1924 4 Sheets-Sheet 1
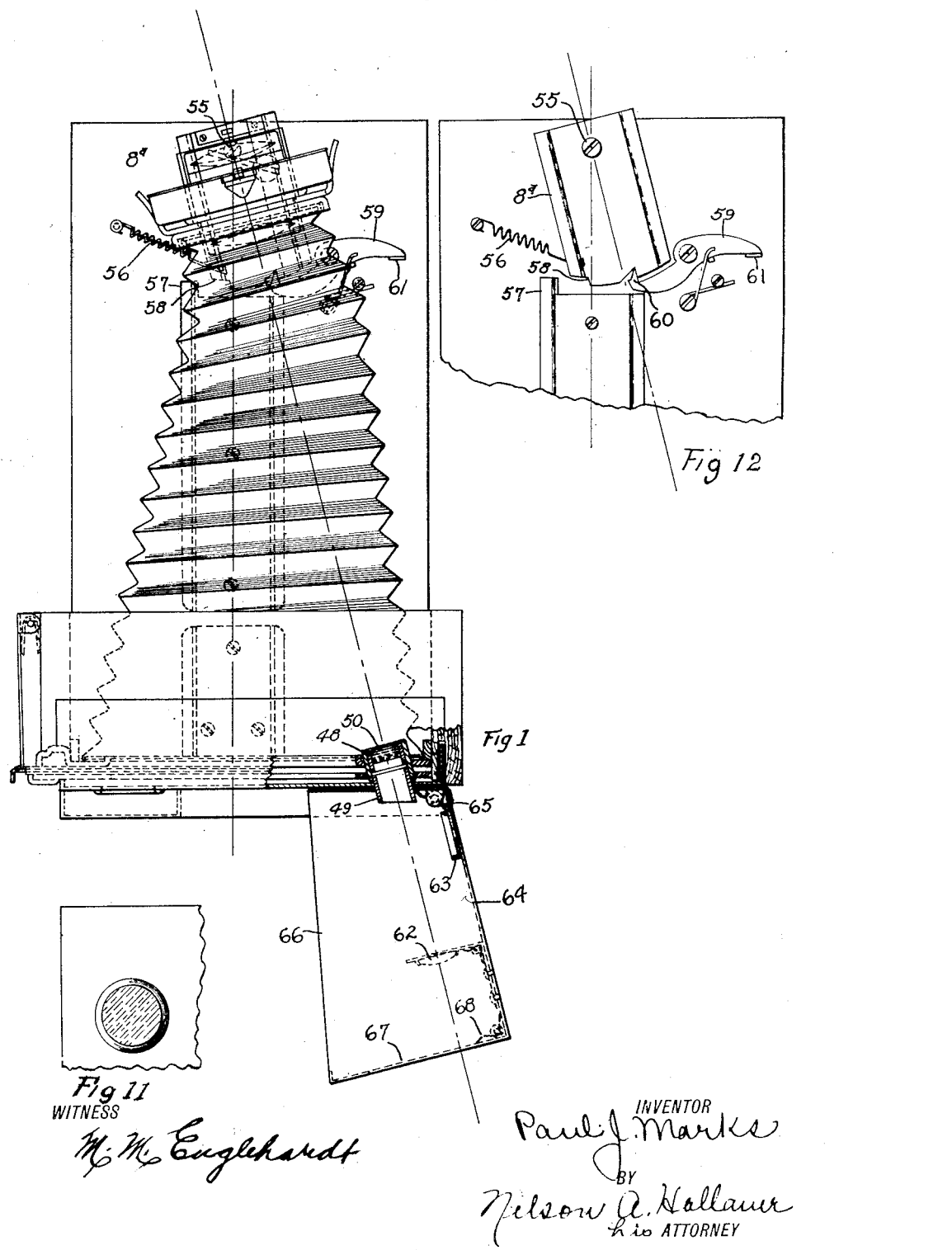

Feb. 17, 1931.   P. J. MARKS   1,792,997
CAMERA
Original Filed Sept. 13, 1924   4 Sheets-Sheet 2
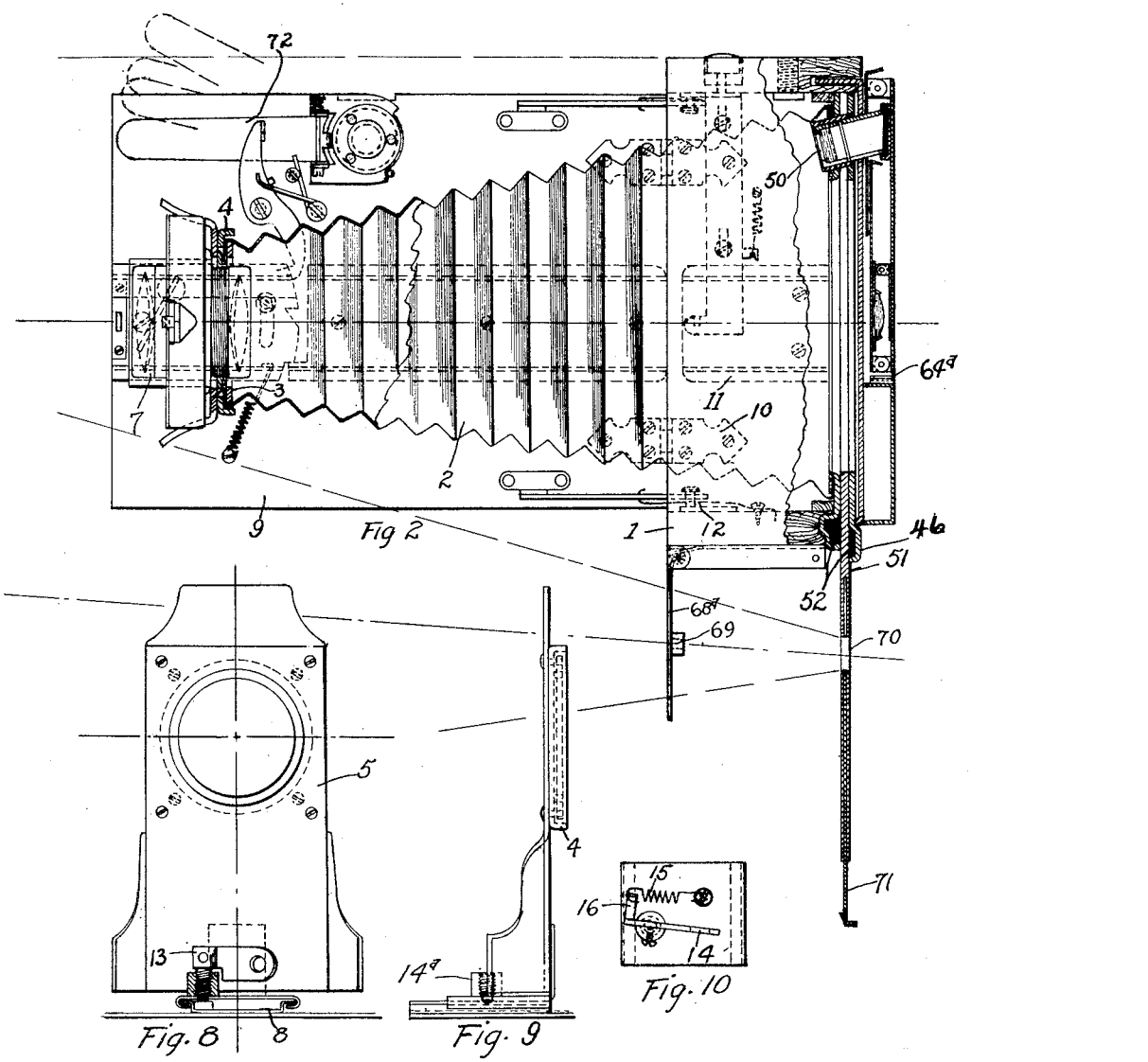
WITNESS
M. M. Engelhardt
INVENTOR
Paul J. Marks,
BY
Nelson P. Hallam
his ATTORNEY Feb. 17, 1931.  P. J. MARKS  1,792,997
CAMERA
Original Filed Sept. 13, 1924  4 Sheets-Sheet 3
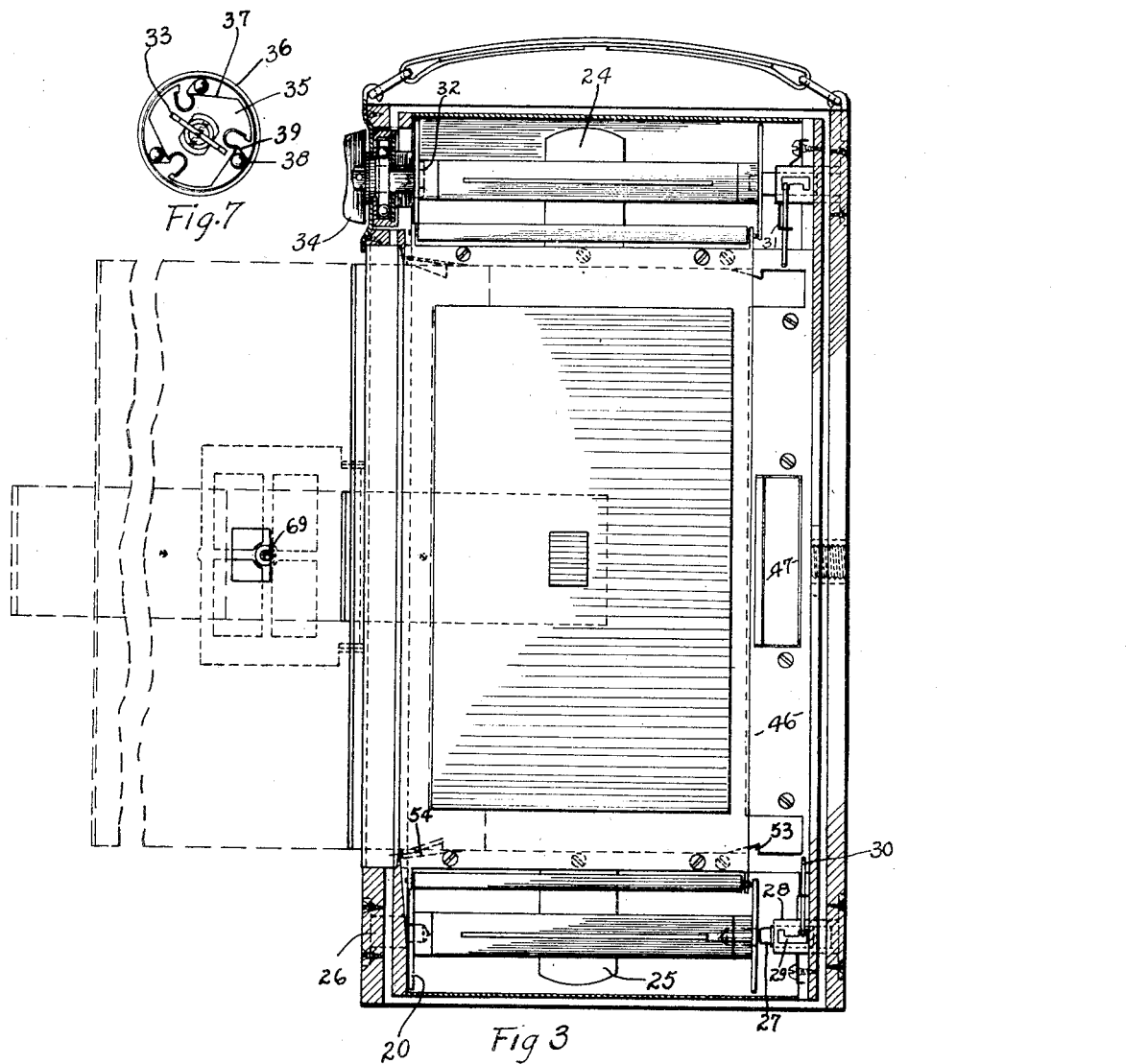

Feb. 17, 1931. P. J. MARKS 1,792,997
CAMERA
Original Filed Sept. 13, 1924 4 Sheets-Sheet 4
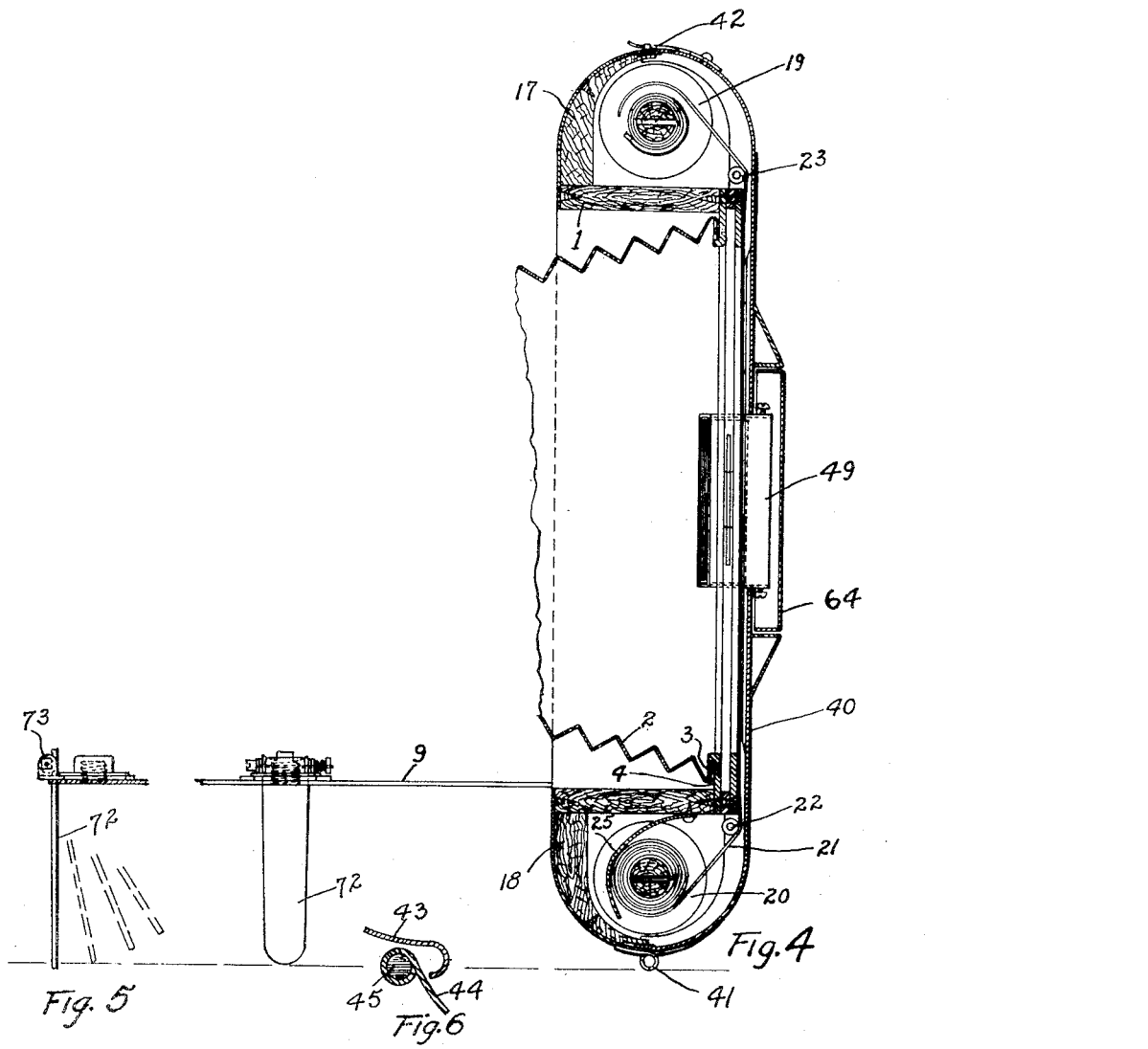

Patented Feb. 17, 1931

1,792,997

UNITED STATES PATENT OFFICE

PAUL J. MARKS, OF ROCHESTER, NEW YORK

CAMERA.

Application filed September 13, 1924, Serial No. 737,465. Renewed January 14, 1930.

In the past, great difficulty has been experienced in securing a sharp focus of the image on the sensitive plate or film in small hand cameras, especially with those employing roll films. The principal object of my invention is to provide simple and convenient means for quickly securing a sharp focus of the image on the light sensitive medium. A further object of the invention is to provide a camera which is simple in construction and by means of which an accurate focus of the image may be obtained on the light sensitive medium while its position in the focal plane of the camera remains undisturbed. Another object of my invention is to provide a camera in which the image produced by the lens may be projected on a ground glass in the focal plane adjacent the light sensitive medium.

To these and other ends my invention resides in certain improvements, combinations and arrangement of parts, hereinafter more fully described and particularly pointed out in the claims at the end of this specification.

In the drawings:

Figure 1 is a plan view of a camera constructed according to one embodiment of my invention, parts being shown in section to more clearly illustrate the construction, parts being shown in focusing position.

Figure 2 is a similar view showing the parts in position for making an exposure.

Figure 3 is a longitudinal section through the back of the camera, showing the construction of the film mounting and winding devices.

Figure 4 is a fragmentary longitudinal section showing the construction of the back and end of the camera.

Figure 5 is a fragmentary view of the front end support.

Figure 6 is a sectional view of a detachable hinge for the back.

Figure 7 is a detail view of the clutch for the film winding devices.

Figure 8 is a front elevation of the lens support, the lens and shutter being removed.

Figure 9 is a side elevation of the device shown in Fig. 8.

Figure 10 is a plan view of the devices for shifting the focal axis to the ground glass.

Figure 11 is a fragmentary rear view showing the observation lens, and

Fig. 12 is a fragmentary detail plan view of the pivoted guide plate and associated parts.

Similar reference characters refer to the same parts in all the figures of the drawings.

Referring to the drawings, 1 is a rectangular frame open at its sides and has the usual folding bellows 2 secured therein adjacent the rear opening by means of the auxiliary frame 3, or by any other suitable or preferred means. At its forward end the bellows is folded inwardly at its edges over a rectangular frame 3 constructed of sheet material and secured in a flanged frame 4 preferably by means of flat headed screws as shown. By this construction the inturned edges of the bellows are securely clamped between the frames 3 and 4, and the flanges on the frame 4 extend over the union to provent the penetration of light. The frame 4 is secured to the rear side of a supporting member 5 by means of screws or other suitable means, which has a circular opening communicating with the openings in the frames 3 and 4 and in which the lens tube 7 carrying the usual lenses and shutter is mounted. The front end support 5 is slidably mounted on a guide plate 8 secured to the bed or board 9 pivotally mounted in the frame 1 by means of the hinges 10. When the bellows 2 is collapsed, the front support 5 slides into the frame 1 and co-operates with an auxiliary guide plate 11 secured to the bottom wall of the frame and the bed or support 9 may be moved on its hinges to close the front end of the frame 1, co-operating spring operated devices serve as a latch to hold it in closed position. The usual devices 12 may be employed to support the board 9 in proper relation to the frame 1, and may be provided with springs which tend to move the board 9 out of the frame when the latch is released. It will be understood that in order to focus or produce a sharp image of an object on a light sensitive medium arranged in the focal plane of the camera back of the frame 1, the lens is adjusted relatively to the focal plane by sliding the lens support 5 along the guideway 8. I have provided novel means for automatically locking the lens support and lens in adjusted position on the guideway. Said means comprises a screw 13 threaded in a sleeve 14 on the lens support 5 and arranged to engage the upper surface of the guideway 8 to clamp the lens support thereto. Adjustably secured to the head of the screw 13 by means of a screw, as shown, or any other suitable means is a hand operated lever 14. When the lever 14 is moved in one direction to turn the screw 13 it is disengaged from the guideway and the lens support is free to slide along the guideway when however the lever is moved in the reverse direction, the screw is turned into engagement with the guideway to secure the lens support in adjusted position. A contractile spring 15 engages the lever 14 or a projection 16 provided thereon, and is anchored to the lens support at its free end and tends to move the lever 14 in a direction to lock the lens support to the guideway.

Projecting from opposite ends of the main frame 1 adjacent the front side thereof are the rearwardly curved parts 17 and 18 in which the spools or rolls 19 and 20 for the light sensitive medium or in the present instance flexible film 21 are mounted. The unexposed film from the spool 20 passes over the guide roller 22 thence across the rear opening in the frame 1 or bellows in the focal plane and over the guide roller 23 to the spool 19 on which it is wound. Leaf springs 24 and 25 co-operate with the spools to prevent accidental winding or unwinding of the film. I have provided novel means for mounting the spools on their pivots or trunnions for permitting the exposed film to be quickly and conveniently removed and an unexposed film to be inserted. Said means comprises a fixed pivot 26 for one end of the spool 20 and a retractable pivot 27 for the opposite end. The pivot 27 is slidably mounted in a tubular member or sleeve 28 projecting inwardly from the end of the housing. In the wall of the sleeve 28 is formed a key hole slot 29 through which a finger piece 30 secured in the pivot projects. It will be noted that the pivot may be retracted or projected by moving the finger piece along the slot and by turning it at either end the pivot will be locked in either retracted or projected position. If desired a spring 31 may engage the finger piece 30 to retain it in locking position. By this construction it will be noted that a simple mounting is provided for the spools permitting them to be quickly and conveniently removed or inserted and that all the parts are completely inclosed within the camera casing. The mounting of the winding spool 19 is similar to that already described for the unwinding spool, except that means are provided for turning the spool to wind the film thereon. In place of the fixed pivot 26 there is provided a pivot 32 revolubly mounted in the housing and having at its inner end a key or angular projection 33 adapted to engage a slot or opening provided therefor in the end of the spool. By this construction the spool is rotated with the pivot. At its exterior end the pivot 32 is provided with a finger piece 34 by means of which the pivot and winding spool may be turned to wind the film. In order to permit the pivot to be rotated freely to wind the film and at the same time lock it against reverse movement to unwind the film a cam member 35 is secured to the pivot to rotate therewith within a co-operating cup member 36. The cam member is provided with one or more inclined cam surfaces 37 between which and the inner surface of the fixed cup member 36 are the rollers or balls 38 which are retained in proper position by means of the springs 39. It will be noted that the cam member is free to be rotated in a clockwise direction in Fig. 7 but when an attempt is made to turn it in the reverse direction the balls 38 roll toward the narrow space between the cam surfaces 37 and the fixed cup and lock the cam against rotation.

Co-operating with the open sides of the parts 17 and 18 and the open rear side of the frame 1 is the camera back in the form of a sheet metal plate or cover 40 detachably hinged at 41 to the rear end of the part 18 and extends rearwardly and upwardly closing the chamber for the unexposed roll of film, and the back of the frame to protect the portion of the sensitive film in exposure position and is then curved upwardly and forwardly to co-operate with the portion 17 to form an inclosed chamber for the exposed roll of film, and to which it is secured by means of a spring latch 42. The detachable hinge 41, shown in detail in Fig. 6 comprises the part 43 bent up from sheet material to the form shown in the drawings and secured to the part 18 and a co-operating portion 44 bent up to engage and hold the pin or shaft 45 with which the portion 43 is adapted to engage.

Mounted in the rear of the camera are novel devices for securing a sharp image of an object through the lens on the focal plane of the camera or the light sensitive medium positioned in the focal plane. Said devices comprise a plate 46 supported on the back of the frame 1 and arranged to one side of the field of the light sensitive medium or film 21. The member 46 has an opening 47 therein in which are mounted the walls 48 which extend inwardly and adjustably support a ground glass or its equivalent 50, in the present instance mounted in a tubular member 50ª. A tubular member 49 carried in the camera back 40 is open at both ends and projects forwardly into opening 47. Slidably mounted in the frame 1 and arranged to cover the sensitive film and protect it from light entering the camera is a dark slide 51. The slide 51 is movable in a guideway provided therefor in the frame 1, the outer opening or mouth of the guideway being protected by the felts or pads 52 engaging opposite sides of the slide. When the slide occupies the position shown in full lines in Fig. 3 it protects the sensitive film from exposure to any light entering the camera, when however, the slide is moved to the dotted line position shown in said figure, the sensitive film may be exposed in the usual manner. In order to prevent the slide being completely withdrawn from the camera, interengaging stops 53 and 54 are provided respectively on the slide 51 and the frame 1.

Normally the axis of a beam of light from the lens falls upon the sensitive film in a direction substantially perpendicular thereto and strikes it at a point at or adjacent its center, in order that as sharp an image as possible may be produced over its entire surface. In order to produce a sharp image on the ground glass 50, I have provided means for swinging the lens support from the normal position in Fig. 2 in which it is substantially parallel with the focal plane to the position shown in Fig. 1, when the axis of the beam of light from the lens falls outside the sensitive film onto the ground glass 50. In order that the focal distance from the lens to ground glass and center of the focal plane may be the same, they both lie substantially in the circumference of a circle described about the pivotal point of the lens support as a center. In other words, the radial distance from the centre of the lens to the ground glass in Fig. 1 position is substantially the same as the radial distance to the focal plane in Fig. 2. For this purpose, the front end 8ª of the guide plate 8 is formed in a separate part and pivoted at 55 to the bed 9 to turn in a plane substantially parallel thereto from the Fig. 2 to the Fig. 1 position. A spring 56 connected to the part 8ª is anchored to the bed 9 and tends to resiliently maintain the part 8ª in the normal Fig. 2 position, and returns it to said position from the Fig. 1 position. Interengaging stops 57 and 58 on the parts limit the action of the spring. Means are provided for locking the part 8ª in the inclined position shown in Fig. 1. Said means comprises a spring pressed latch 59 pivoted on the part 9 and having a projection 60 adapted to engage a notch provided therefor in the part 8ª. Forward pressure on the finger piece 61 on the latch releases the part 8ª and permits the spring 56 to return the parts to normal position. When it is desired to make an exposure the slide 51 is inserted to cover and protect the sensitive film and the lens shutter opened as for a time exposure. The lens support is then inclined to the Fig. 1 position and the beam of light directed to the ground glass 50. The finger piece 14 is then engaged to release the lens board from its guideway and adjusted to that position in which a sharp image of the object to be photographed is produced on the ground glass 50. The parts are then returned to normal position and since the focal distance from the lens to the sensitive film is the same as from the lens to the ground glass a sharp image of the object will now be produced on the sensitive film. If desired a lens 62 may be mounted in position for magnifying the image on the ground glass. Means are also provided for closing the open rear end of the tubular member 49 to shut off the light from the ground glass which might "fog" the sensitive film when the slide 51 is withdrawn. Said means comprises a flanged cover 63 adapted to fit over the rear end of the member 49 and which may be lined with felt if desired, to more securely shut out the light. The member 63 is carried on a support 64 hinged on the cover or back of the camera 40 to move from a collapsed position adjacent the back, in which position the member 63 closes the rear opening in the member 49, to the extended position shown in Fig. 1 in which position the ground glass is exposed for observation from the rear. A spring 65 may be associated with the hinge of the member 64 to resiliently maintain said member in extended position. The lens 62 is conveniently hinged to the member 64 and resiliently maintained in the operative position shown in Fig. 1 by means of a spring. When the member 64 is moved to closing position the lens 62 engages the back 40 and swings against the action of its spring to the plane of the member 64. The hood 66 is secured at its forward end to camera back arched around over the rear end of the member 49 and extends rearwardly with its edges secured to the member 64, it arches over the lens 62 and has its open rear end secured in a frame 67 hinged to the member 64 and movable to a position between the member 64 and back of the camera when the member 64 is moved to closed position. A spring 68 associated with the pivot of the frame 67 tends to maintain the frame in the extended or upright position shown in Fig. 1. The member 64 is held in the closed position shown in Fig. 4 by means of a suitable spring latch 64ª.

I have provided novel means for directing the camera to the desired field during the interval of exposure. Said means comprises a substantially rectangular frame 68A collapsibly mounted on the frame 1, and normally when not in use is folded against the frame or in a pocket in the frame provided therefor. When in use the frame 68A is withdrawn to a position at substantially right angles to the side of the frame 1 or parallel with the lens support 5 and slide 51. The frame 68A has a rectangular opening intersected by a pair of cross bars and pierced at their intersection to provide a central pinhole opening 69. When withdrawn the slide 51 obscures the view through the frame 68 from the rear, and in order to permit the view through said frame to be observed, I have provided a suitable opening 70 in the slide 51 directly in rear of the opening 69. The opening 70 is also rectangular in form and of smaller dimensions than the opening 69 and serves as an eye piece through which the image produced on the sensitive film is substantially visible in the frame 68A, the opening 69 serving to locate the centre of the image or field of exposure. A slide 71 is mounted to slide in a guideway provided therefor in the slide 51 and is adapted to close the opening 70 when the slide 51 is employed to protect the sensitive film.

In order to conveniently support the camera in either vertical or horizontal position an adjustable support 72 is provided. The support 72 is mounted on the bed or support 9 and normally lies adjacent its surface as shown in Fig. 2. The member 72 is swiveled or pivoted to the board 9 to move to the broken line positions indicated in Fig. 2, in which positions it is held by friction. When it is desired to make an exposure with the longer side of the camera in a horizontal position, as illustrated, camera may be supported on the frame 1 and the support 72 adjusted to support the front end of the camera in proper position. In order to support the camera in the upright position shown in Fig. 4, the support may be moved to a position at substantially right angles to the board 9, and then folded downwardly to a substantially vertical position on the pivot 73 arranged intermediate its ends. When arranged in the vertical position shown in Figs. 4 and 5, it terminates in a point in a plane passing through the hinge 41 and substantially parallel with the member 9. In order to support the camera in several positions the member 72 may be adjusted as shown by the broken lines and held in adjusted position by friction. When the camera is folded up and closed, the member 72 is returned to the position shown in full lines in Fig. 2.

Having described my invention what I claim and desire to secure by Letters Patent is:

1. In a camera, the combination of a frame, a lens, means on the frame for supporting a light sensitive medium in substantially the focal plane of the lens, means arranged to receive the image produced by the lens, and a slide separate from the image receiving means and arranged in the focal plane for shielding the sensitive medium while observing the image.

2. In a camera, the combination of a frame, a lens, means on the frame for supporting a light sensitive medium in substantially the focal plane of the lens, a ground glass arranged to receive the image produced by the lens, and a slide separate from ground glass arranged in the focal plane adapted to shield the sensitive medium while observing the ground glass.

3. In a camera, the combination of a frame, means on the frame for supporting a light sensitive medium, a bellows mounted on said frame and arranged to inclose the light sensitive medium, a lens in said bellows opposite the light sensitive medium, and means fixed in said frame and arranged in said bellows for rseceiving the image produced by the lens while the sensitive medium occupies its normal position.

4. In a camera, the combination of a frame, means on the frame for supporting a light sensitive medium, a bellows mounted on said frame and arranged to inclose the light sensitive medium, a lens in said bellows opposite the light sensitive medium, a ground glass fixed in the frame adjacent the light sensitive medium, and means for directing the image produced by the lens to the ground glass while the sensitive medium occupies its normal position.

5. In a camera, the combination of a frame, means on the frame for supporting a light sensitive medium, a bellows mounted on said frame and arranged to inclose the light sensitive medium, a lens in said bellows opposite the light sensitive medium, a guideway on which the lens is movable, a ground glass, a means for moving the guideway to direct the image produced by the lens to the ground glass.

6. In a camera, the combination of a frame, means on the frame for supporting a light sensitive medium, a movable guideway, a lens adapted to produce an image on the light sensitive medium and supported on said guideway, a ground glass adjacent the light sensitive medium, and means for moving the guideway to direct the image produced by the lens to the ground glass.

7. In a camera, the combination of a frame, means on the frame for supporting a light sensitive medium, a movable guideway, a lens adapted to produce an image on the light sensitive medium and supported on said guideway, a ground glass adjacent the light sensitive medium, means for moving the guideway to direct the image produced by the lens to the ground glass, and means for locking the guideway.

8. In a camera, the combination of a frame, means on the frame for supporting a light sensitive medium, a pivoted guideway, a lens adapted to produce an image on the light sensitive medium and adjustable on said guideway, a ground glass, and means for moving the guideway on its pivot to direct the image to the ground glass.

9. In a camera, the combination of a frame, means on the frame for supporting a light sensitive medium, a pivoted guideway, a lens adapted to produce an image on the light sensitive medium and adjustable on said guideway, a ground glass. means for moving the guideway on its pivot to direct the image to the ground glass, and a latch for locking the guideway in moved position.

10. In a camera, the combination of a frame, means on the frame for supporting a light sensitive medium, a pivoted guideway, a lens adapted to produce an image on the light sensitive medium and adjustable on said guideway, a ground glass, means for moving the guideway on its pivot to direct the image to the ground glass, a latch for locking the guideway in moved position, and resilient means for returning the guideway to normal position.

11. In a camera, the combination of a frame, means on the frame for supporting a light sensitive medium, a lens adapted to produce an image on the light sensitive medium, a ground glass mounted in the frame adjacent the light sensitive medium, a bellows arranged between the lens and frame and inclosing the light sensitive medium and ground glass, means for directing the focal axis of the lens to the ground glass, and means for protecting the sensitive medium while observing the image on the ground glass.

12. In a camera, the combination of a frame, means on the frame for supporting a light sensitive medium, a lens adapted to produce an image on the light sensitive medium, a bellows arranged between the lens and frame and inclosing the light sensitive medium and ground glass, and means for directing the focal axis of the lens to the ground glass while its position in the bellows remains unchanged.

13. In a camera, the combination of a frame, means on the frame for supporting a light sensitive medium, a lens adapted to produce an image on the light sensitive medium, a ground glass mounted in the frame adjacent the light sensitive medium, and means for turning the lens about an axis arranged substantially perpendicular to its own axis to direct the image to the ground glass.

14. In a camera, the combination of a frame, a bellows, means on the frame for supporting a light sensitive medium in one end of said bellows, a ground glass arranged in said bellows adjacent the light sensitive medium, a lens arranged in the other end of said bellows and movable to direct an image to the light sensitive medium or the ground glass, and means for enlarging the image observed on the ground glass.

15. In a camera, the combination of a frame, a lens, means on the frame for supporting a light sensitive medium adapted to receive the image produced by the lens, a ground glass arranged laterally of the sensitive medium, means for directing the image to said ground glass, a slide movable in the focal plane for protecting the sensitive medium, and means for limiting the movement of said slide in both directions.

16. In a camera, the combination of a frame, means for supporting a light sensitive medium on said frame, a lens adapted to project an image on the light sensitive medium, a slide movable in the frame to protect the light sensitive medium against accidental exposure to light and having an opening through which the object to be photographed may be seen when the slide is withdrawn and means for closing said opening.

17. In a camera, the combination of a frame, means for supporting a light sensitive medium on said frame, a lens adapted to project an image on the light sensitive medium, a slide movable in the frame to protect the light sensitive medium against accidental exposure to light and having an opening through which the object to be photographed may be seen when the slide is withdrawn, a member mounted on the frame and arranged in a plane substantially parallel with said slide and having an opening in substantial axial alignment with the opening in the slide, and movable means for opening and closing the opening in the slide.

18. In a camera, the combination of a frame, means for supporting a light sensitive medium on said frame, a lens adapted to project an image on the light sensitive medium, a slide movable in the frame to protect the light sensitive medium against accidental exposure to light and having an opening through which the object to be photographed may be seen when the slide is withdrawn, a member mounted on the frame substantially flush with the side thereof but movable to a position substantially parallel with the slide and provided with an opening in substantial axial alignment with the opening in the slide, and means for closing the opening in the slide.

19. In a camera, the combination of a frame, means for supporting a light sensitive medium on said frame, a lens adapted to project an image on the light sensitive medium, a slide movable in the frame to protect the light sensitive medium against accidental exposure to light and having an opening through which the object to be photographed may be seen when the slide is withdrawn, a member mounted on the frame and arranged in a plane substantially parallel with said slide and having an opening for defining the outlines of the object viewed through the opening in the slide, and means for closing the opening in the slide.

20. In a camera, the combination of a frame, means for supporting a light sensitive medium on said frame, a lens adapted to protect an image on the light sensitive medium, a slide movable in the frame to protect the light sensitive medium against accidental exposure to light and having an opening through which the object to be photographed may be seen when the slide is withdrawn, a finder frame arranged in a plane substantially parallel with said slide and provided with a centrally arranged opening for locating the center of the object viewed through the opening in the slide, and means for closing the opening in the slide.

21. In a camera, the combination of a frame, a bellows mounted in said frame, a lens, means for supporting a light sensitive medium in said bellows, a ground glass adapted to receive the image produced by the lens and arranged to be observed through an opening in the camera, a hood arranged to shade the ground glass and collapsible to close the opening, a lens in the hood for magnifying the image on the ground glass, and a collapsible support for said lens.

22. In a camera, the combination of a frame, means on the frame for supporting a light sensitive medium, a lens, a ground glass in said bellows arranged to receive the image produced by the lens, and means for enlarging the image observed on the ground glass.

PAUL J. MARKS.